United States Patent
Peng et al.

(10) Patent No.: US 9,106,484 B2
(45) Date of Patent: Aug. 11, 2015

(54) LOW LATENCY NX10G FORM FACTOR MODULE TO AN ENHANCED SMALL FORM-FACTOR PLUGGABLE UPLINK EXTENDER TO MAXIMIZE HOST PORT DENSITY

(75) Inventors: Liang Ping Peng, Santa Clara, CA (US); Norman Tang, Los Altos, CA (US); David Lai, Mountain View, CA (US); Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 464 days.

(21) Appl. No.: 13/539,691

(22) Filed: Jul. 2, 2012

(65) Prior Publication Data

US 2014/0003448 A1    Jan. 2, 2014

(51) Int. Cl.
*H04J 3/00*    (2006.01)
*H04L 29/10*    (2006.01)
*H04L 12/24*    (2006.01)

(52) U.S. Cl.
CPC .............. *H04L 29/10* (2013.01); *H04L 41/083* (2013.01)

(58) Field of Classification Search
CPC ......... H04J 3/16; H04J 3/1682; H04J 3/1694; H04J 9/00
USPC .................................. 370/464, 465, 466, 467
See application file for complete search history.

(56) References Cited

U.S. PATENT DOCUMENTS

| | | | |
|---|---|---|---|
| 2008/0131118 A1* | 6/2008 | Chiang ........................... | 398/45 |
| 2009/0046745 A1* | 2/2009 | Shin et al. ..................... | 370/535 |
| 2010/0274876 A1 | 10/2010 | Kagan et al. | |
| 2010/0296817 A1* | 11/2010 | Togami et al. ................ | 398/139 |
| 2011/0066822 A1* | 3/2011 | Ikeda ............................. | 711/170 |
| 2011/0135312 A1* | 6/2011 | El-Ahmadi et al. .......... | 398/135 |
| 2011/0255574 A1 | 10/2011 | Carter et al. | |
| 2011/0299858 A1 | 12/2011 | Mazzini et al. | |
| 2012/0051735 A1 | 3/2012 | Achkir et al. | |
| 2012/0071011 A1 | 3/2012 | Kagan et al. | |
| 2012/0102239 A1* | 4/2012 | Huang ............................ | 710/14 |
| 2012/0287926 A1* | 11/2012 | Anantharam et al. ......... | 370/355 |
| 2013/0156077 A1* | 6/2013 | Au et al. ........................ | 375/220 |
| 2013/0279856 A1* | 10/2013 | Boduch et al. ................. | 385/59 |

\* cited by examiner

*Primary Examiner* — Hassan Phillips
*Assistant Examiner* — Siren Wei
(74) *Attorney, Agent, or Firm* — Edell, Shapiro & Finnan, LLC

(57) ABSTRACT

A system, method and apparatus is provided for optimizing network data communications. At an extender device, a data signal is received at a host link port across a data cable that is interfaced with the host link port. The host link port is configured to receive the data signal. The data cable is configured to carry management communications and data communications between a switch host device and the extender unit device. The data signal is split into data signal components. Each of the data signal components comprises a ten gigabit per second portion of the data signal. The data signal components are sent to one or more network devices via one or more corresponding data transmission ports.

18 Claims, 5 Drawing Sheets

LOW LATENCY NX10G FORM FACTOR MODULE TO AN ENHANCED SMALL FORM-FACTOR PLUGGABLE UPLINK EXTENDER TO MAXIMIZE HOST PORT DENSITY

TECHNICAL FIELD

The present disclosure relates to optimizing network communications.

BACKGROUND

Modern data center networks require high bandwidth capacities to meet performance and flexibility requirements demanded by new applications. Such network environments use transceiver units to send and receive data communications at high speeds. For example, enhanced quad-small form-factor pluggable (QSFP+) transceivers are configured to send and receive data communications at a data rate of 40 gigabits per second (e.g., in compliance with the 40G Ethernet communication standard). Additionally, transceiver modules, such as CXP transceiver modules, are configured to send and receive data communications at even higher data rates of 100 gigabits per second (e.g., in compliance with the 100G Ethernet communication standard) and 120 gigabits per second (e.g., in compliance with the 12×10G Ethernet communication standard). These transceiver modules, however, have limited reach capabilities and may not be able to send and receive data over extended distances.

DESCRIPTION OF EXAMPLE EMBODIMENTS

Overview

Figure 1:
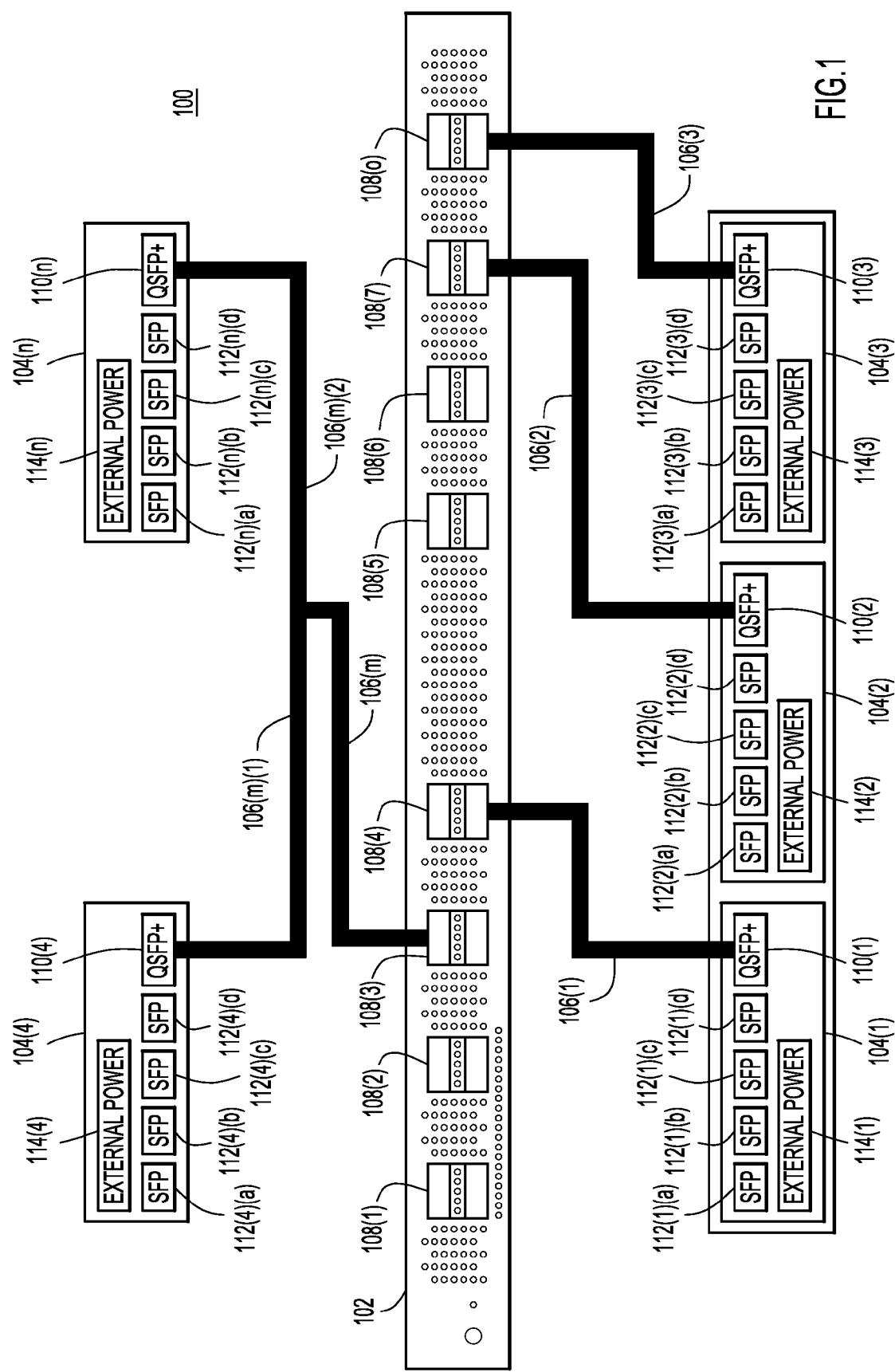
FIG. 1 shows an example system topology comprising a switch host device that is configured to send and receive extended reach data communications via one or more of a plurality of extender units.

Techniques are provided for optimizing network data communications. These techniques are embodied as a system, method and apparatus. A system is provided comprising a switch host device, one or more extender units and a data cable. The switch host device comprises one or more host ports, each of which is configured to interface with either an enhanced quad-small form-factor pluggable (QSFP+) transceiver module capable of sending and receiving data at a first data rate of 40 gigabits per second (40G) or with a 12× small form-factor pluggable CXP transceiver module capable of sending and receiving data at a second data rate of up to 120 gigabits per second (120G). The one or more extender units each comprise a host link port and a plurality of data transmission ports. The data transmission ports are each configured to interface with an enhanced small form-factor pluggable (SFP+) transceiver module that is capable of sending and receiving data at a data transmission rate of up to 10 gigabits per second (10G). The data cable has a first end configured to interface with one of the host ports of the switch host device and has one or more second ends configured to interface with one or more of the host link ports of the extender units. The data cable is configured to carry management communications and data communications between the switch host device and the one or more extender units.

Additionally, a method is provided for receiving, at an extender unit device, a data signal at a host link port across a data cable interfaced with the host link port. The host link port is configured to receive the data signal, and the data cable is configured to carry management communications and data communications between a switch host device and the extender unit device. The data signal is split into data signal components, and each of the data signal components comprises a 10G portion of the data signal. The data signal components are sent to one or more network devices via one or more corresponding data transmission ports.

Furthermore, an apparatus is provided comprising a first set of signal pins configured to interface with a host port of a switch host device and a second set of pins in communication with the first set of signal pins via a data channel. The second set of signal pins is configured to interface with a host link port of an extender unit device. The apparatus also comprises a first transmission electrical interface unit and a first reception electrical interface unit, wherein the first transmission electrical interface unit interfaces with one of the first set of signal pins in a transmission signal path to carry management communications and data communications. The apparatus further comprises a second transmission electrical interface unit and a second reception electrical interface unit. The first transmission electrical interface unit interfaces with one of the second set of signal pins in the transmission signal path to carry management communications and data communications. The second reception electrical interface unit interfaces with one of the second set of signal pins in the reception signal path to carry management communications and data communications.

In addition, an apparatus is provided comprising a host link port, a clock data recover (CDR) unit and one or more data transmission ports. The host link port is configured to interface with a data cable and to receive a data signal from a switch host device at the host link port from the data cable. The CDR unit is coupled to the host link port and is configured to split the data signal into data signal components, wherein each of the data signal components comprises a 10G portion of the data signal. The one or more data transmission ports are coupled to the CDR unit and are configured to send the data signal components to one or more system devices via corresponding ones of the data transmission ports.

Example Embodiments

The techniques described herein are directed to providing extended reach capabilities for high speed data transmissions. An example system topology 100 is shown in FIG. 1. The system topology ("system") 100 comprises a switch host device, shown at reference numeral 102, and a plurality of extender unit devices ("extender units"), shown at reference numerals 104(1) to 104(n). The switch host device 102 interfaces with the one or more extender units 104(1)-104(n) via a plurality of data cables, shown at reference numerals 106(1)-106(m). The data cables 106(1)-106(m) are configured to carry communications (e.g., data communications and management communications) between the switch host device 102 and the extender units 104(1)-104(n). In one embodiment, the extender units 104(1)-104(n) may be grouped together within a single consolidated extender unit device, shown at reference numeral 107. In FIG. 1, extender units 104(1), 104(2) and 104(3) are shown as being grouped together. In another embodiment, the extender units 104(1)-104(n) may be separate devices. In FIG. 1, the extender units 104(4) and 104(n) are shown as separate devices. These groupings are simply used as an example.

FIG. 1 also shows a plurality of host ports on the switch host device 102. The host ports are shown at reference numerals 108(1)-108(o). As described herein, the host ports 108(1)-108(o) are each configured to interface with transceiver devices (not shown in FIG. 1) that send and receive data communications (e.g., high speed data communications) at enhanced data rates to and from the switch host device 102. The transceiver devices also send and receive management communications (e.g., low speed management communications) to and from the switch host device 102. For example, the host ports 108(1)-108(o) may be configured to interface with enhanced quad-small form-factor pluggable (QSFP+) transceiver modules ("QSFP+ transceivers") capable of sending and receiving data (e.g., Ethernet communications) at a data rate of 40 gigabits per second (herein "40G data," "40G communications," "40G data communications," or "40G"). The host ports 108(1)-108(o) may also be configured to interface with CXP transceiver modules ("CXP transceivers") capable of sending and receiving data at a data rate of 100 gigabits per second (herein "100G data," "100G communications," "100G data communications," or "100G") or at a data rate of up to 120 gigabits per second (herein "120G data," 120G communications," "120G data communications," or "120G").

All of the host ports 108(1)-108(o) may be configured to interface with corresponding QSFP+ transceiver modules or they may all be configured to interface with corresponding CXP transceiver modules. Alternatively, each of the host ports 108(1)-108(o) may be configured to interface with either a corresponding QSFP+ transceiver module or a corresponding CXP transceiver module. In another example, the host ports 108(1)-108(o) may be dedicated ports that are configured to interface with only one of a QSFP+ transceiver module or a CXP transceiver module. In one embodiment, the host port 108(1) may be configured to interface with the QSFP+ transceiver module, the host port 108(2) may be configured to interface with the CXP transceiver module, the host port 108(3) may be configured to interface with the CXP transceiver module, and so on. It should be appreciated that the host ports 108(1)-108(o) may be also configured to interface with other transceiver modules, and for simplicity, it is assumed that the host ports 108(1)-108(o) interface with either QSFP+ transceiver modules or CXP transceiver modules.

FIG. 1 also shows a host link port and a plurality of transmission ports on each of the extender units 104(1)-104(n). The host link port is shown at reference numerals 110(1)-110(n) for corresponding extender units 104(1)-104(n). The transmission ports are shown at reference numerals 112(1)(a)-112(n)(a), 112(1)(b)-112(n)(b), 112(1)(c)-112(n)(c) and 112(1)(d)-112(n)(d) for corresponding extender units 104(1)-104(n). As shown in FIG. 1, each extender unit 104(1)-104(n) has one host link port and four data transmission ports, though it should be appreciated that any number of host link ports and data transmission ports may be present in each of the extender units 104(1)-104(n). Additionally, each of the extender units 104(1)-104(n) has an external power port, shown at reference numerals 114(1)-114(n), to receive external power that is used to power each of the extender units 104(1)-104(n).

As stated above, communications (e.g., data communications and management communications) may be sent from the switch host device 102 to one or more of the extender units 104(1)-104(n). For example, the transceiver devices coupled to the host ports 108(1)-108(o) of the switch host device 102 may enable communications between the switch host device 102 and the extender units 104(1)-104(n) via one or more of the host ports 108(1)-108(o) across one or more of the data cables 106(1)-106(m). Each of the data cables 106(1)-106(m) has a first end that is configured to interface with (e.g., plug into) one of the host ports 108(1)-108(o) of the switch host device 102 and one or more second ends configured to interface with (e.g., plug into) one or more of the host link ports 110(1)-110(n) of the extender units 104(1)-104(n).

The data cables 106(1)-106(m) may be configured to deliver communications between the switch host device 102 and one or more extender units 104(1)-104(n). For example, as shown in FIG. 1, data cables 106(1)-106(3) are configured to enable communications between the switch host device 102 and the extender units 104(1)-104(3), respectively (via respective host ports 108(4), 108(7) and 108(o) and respective host link ports 110(1)-110(3)). Additionally, as shown in FIG. 1, the data cable 106(m) is configured to enable communications between the switch host device 102 and the extender units 104(4) and 104(n) (via host port 108(3) and respective host link ports 110(4) and 110(n)). That is, the data cables may have a one-to-one correspondence between a host port and a host link port or may operate as a split data cable delivering communications from a single host port to multiple host link ports. The split data cable is shown at reference numerals 106(m)(1) and 106(m)(2), and each of the split data cables operate in a similar manner as the other data cables. For example, the data cable 106(m) may be configured with a first end configured to interface with one of the host ports 108(1)-108(o) and may be configured with a plurality of second ends, each of which is configured to interface with the host link port for one of a plurality of extender units.

In one example, a QSFP+ transceiver may be coupled to one of the host ports. Communications may be sent between the QSFP+ transceiver and a corresponding extender unit via a data cable that is coupled to the host port and to the host link port of the corresponding extender unit. In this example, the host link port of the corresponding extender unit may be a QSFP+ host link port configured to send and receive communications to and from a QSFP+ transceiver. As described by the techniques herein, upon receiving the 40G QSFP+ communications from the host port, the extender unit may send the 40G communications to appropriate network devices (not shown in FIG. 1) via the data transmission ports of the extender unit. In this example, the data extender ports of the extender units are four enhanced small form-factor pluggable (SFP+) ports, each of which is capable of transmitting data at a data rate of ten gigabits per second (referred to hereinafter as "10G data," "10G communications," "10G data communications" or "10G") over extended reach distances.

In another example, as described herein a CXP transceiver may be coupled to one of the host ports. Communications may be sent between the CXP transceiver and a plurality of corresponding extender units via a custom data cable (e.g., a custom CXP to QSFP+ Y-data cable). In this example, the host link port of the corresponding extender units may also be QSFP+ host link ports, and multiple extender units may be used to send the 100G data or 120G data originating from the CXP transceiver to the appropriate network devices across SFP+ data transmission ports of the extender units. For example, when 100G data is sent from the switch host device 102, three extender units may receive portions of the 100G data and may utilize, in total, ten SFP+ data transmission ports to deliver the 100G data. Likewise, when 120 data is sent from the switch host device 102, three extender units may receive portions of the 120G data (e.g., three 40G portions) and may utilize, in total, 12 SFP+ data transmission ports to deliver the 120G data.

Figure 2:
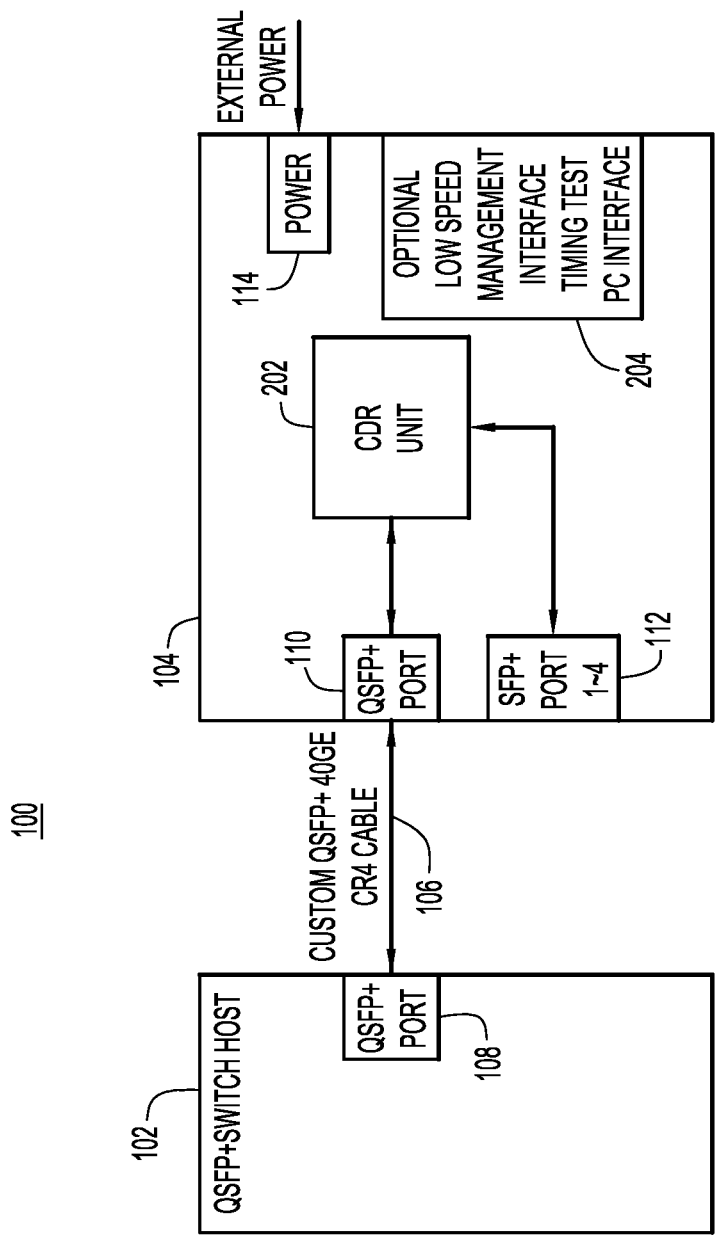
FIG. 2 shows an example block diagram of one of the extender units in communication with the switch host device.

Reference is now made to FIG. 2. FIG. 2 shows an example block diagram of one of the extender units 104(1)-104(n) in communication with the switch host device 102. The extender unit in FIG. 2 is shown as reference numeral 104 and may represent any of the extender units 104(1)-104(n) in the system 100. In FIG. 2, the switch host device 102 is shown having a host port 108. The host port 108 may be any of the host ports 108(1)-108(o), described above. The host port 108 is depicted as a QSFP+ host port. The switch host device 102 communicates with the extender unit 104 via a data cable 106. The data cable 106 may be any of the data cables 106(1)-106(m) described above. The extender unit 104 is shown as having a host link port 110 and a data transmission port 112. The host link port 110 may be any of the host link ports 110(1)-110(n) described above, and the data transmission port may be any of the data transmission ports described in FIG. 1. The host link port 110 is depicted as a QSFP+ host link port, and the data transmission port 112 is depicted as an SFP+ data transmission port.

The extender unit 104 also has an electronic dispersion compensation (EDC)/clock data recovery (CDR) unit (hereinafter "CDR unit") shown at reference numeral 202. The CDR unit 202 is coupled to the host link port 110 and the data transmission port 112. Additionally, the extender unit 104 has an external power port 114, which may represent any of the external power ports 114(1)-114(n) described above. Optionally, the extender unit 104 also has a low speed management interface unit to receive and adjust timing signals of the extender unit 104. The low speed management interface unit is shown at reference numeral 204.

As stated above, the extender unit 104 receives data communications (e.g., high speed data communications) from the switch host device 102 via the data cable 106. These data communications may be 40G data originating from a QSFP+ transceiver or may be 100G or 120G data originating from a CXP transceiver (e.g., for 120G data: a 12×10G SFP+ transceiver or a 3×40G QSFP+ transceiver). It should be appreciated, however, that data communications may be received by the extender unit 104 (e.g., N×10G transmissions from an N×10 transceiver module). The extender unit 104 also receives management communications (e.g., low speed management communications) from the switch host 102 via the data cable 106. Likewise the extender unit 104 may send data communications and management communications to the switch host 102 via the data cable 106.

Upon receiving data communications and management communications from the switch host device 102, the host link port 110 of the extender unit 104 sends the communications to the CDR unit 202. The CDR unit 202 then splits the communications into 10G data communication components. For example, when the data communications received from the switch host device 102 are 40G communications, the CDR unit 202 splits the 40G communications into four 10G communications. Likewise, in one example, when the data communications sent from the switch host device 102 are 100G or 120G communications, only a 40G portion of the 100G or 120G communications is sent to each extender unit 104, and thus, three extender units may be used to ultimately transmit the 100G or 120G communications. In other words, each of the extender units, for example, has four 10G data transmission ports, and thus, each extender unit is able to send a 40G portion of the 100G or 120G communication. Upon receiving a 40G portion of the 100G or 120G communication, the CDR unit 202 splits the 40G portion into four 10G communications. These 10G communications are then sent from the CDR unit 202 to each of the four data transmission ports (shown generally at reference numeral 112). In another example (not shown in FIG. 2), when the data communications sent from the switch host device 102 are 100G or 120G communications, a single extender unit 104 may split the 100G or 120G communications into ten 10G portions or 12 10G portions (e.g., when the extender unit 104 comprises ten or 12 data transmission ports).

As stated above, the data transmission ports may be SFP+ ports configured to send 10G data communications across extended distances (e.g., ten, 40, 80 kilometers and beyond). Thus, the extender unit 104 enables 40G, 100G and 120G communications to be sent across distances that are greater than distances of data transmissions enabled by the QSFP+ transceiver module or the CXP transceiver module. For example, without utilizing the extender units, QSFP+ transceivers and CXP transceivers may currently send and receive communications across relatively short distances (e.g., up to 125 meters). After utilizing the extender units, QSFP+ transceivers and CXP transceivers may send and receive communications across relatively long distances (e.g., ten, 40, 80 kilometers and beyond). Additionally, the extender units allow for the switch host device 102 to retain maximum port density for sending and receiving enhanced data communications (e.g., 40G, 100G and 120G data) while providing low-latency, extended reach capabilities for these communications. Furthermore, since management communications are able to be exchanged between the switch host device 102 and the extender units, additional management interface units are not required for the extender units.

The extender unit 104 is also configured to send data communications (e.g., 40G, 100G and 120G communications) received from network devices (not shown in FIG. 2) to the switch host device 102 via the data cable 106. For example, the extender unit 104 may receive four 10G communications (e.g., over extended distances of ten kilometers and beyond) at each of the data transmission ports 112. Upon receiving these communications, the extender unit 104 sends each of the four 10G communications to the CDR unit 202. The CDR unit 202 combines the four 10G communications into a 40G communication, and sends the 40G communication to the host link port 110 for ultimate transmission to the switch unit device 102 via the data cable 106. The extender unit 104 my receive 100G and 120G communications in 40G portions, and may send the 40G portions to the switch host device 102. For example, three extender units 104 may each receive four 10G communications from network devices for ultimate transmission of 120G data to the switch host device 102 by utilizing the techniques described above.

Figure 3:
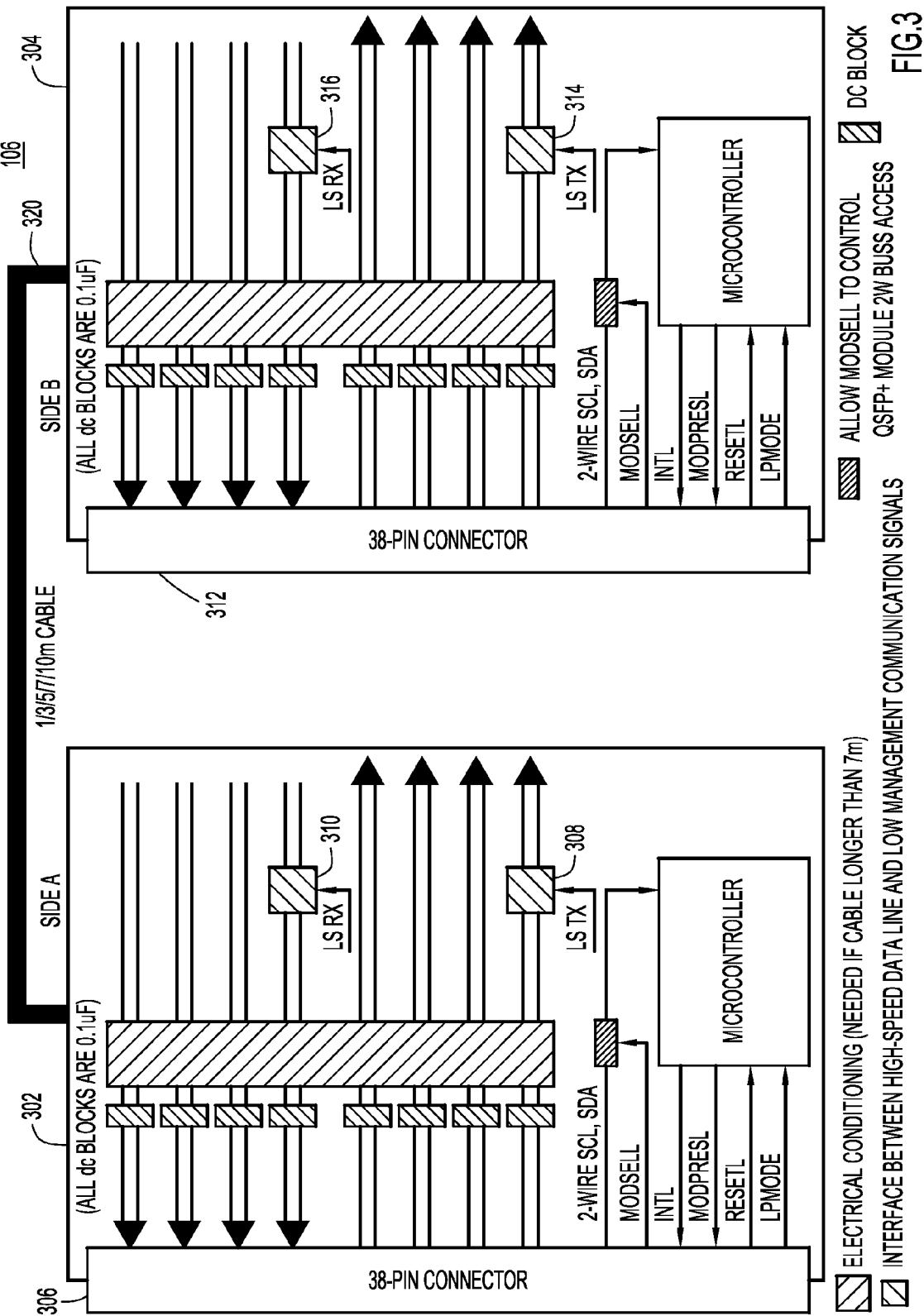
FIG. 3 shows an example of a data cable configured to interface with the switch host device and one of the extender units to deliver high speed data communications between the switch host device and the extender unit.

Reference is now made to FIG. 3. FIG. 3 shows an example of the data cable 106 that is configured to interface with the switch host device 102 and one of the extender units 104(1)-104(n). The data cable 106 enables delivery of high speed data communications between the switch host device and the extender units 104(1)-104(n). It should be appreciated that the data cable 106 may be any of the data cables 106(1)-106(m) described above.

The data cable 106 comprises a first connecting unit 302 and a second connecting unit 304. The first connecting unit 302 comprises a first set of signal pins 306 (e.g., a 38-pin connector) that is configured to interface with one of the host ports 108(1)-108(o) of the switch host device 102. The first connecting unit 302 also comprises a first transmission electrical interface unit 308 and a first reception electrical interface unit 310. The first transmission electrical interface unit 308 interfaces with one of the first set of signal pins 306 in a transmission signal path to carry management communications and data communications. The first reception electrical interface unit 310 interfaces with one of the first set of signal pins 306 in a reception signal path also to carry management communications and data communications.

The second connecting unit 304 comprises a second set of signal pins 312 (e.g., a 38-pin connector) that is configured to interface with one of the host link ports 110(1)-110(n) of the extender units 104(1)-104(n). The second connecting unit 304 also comprises a second transmission electrical interface unit 314 and a second reception electrical interface unit 316. The second transmission electrical interface unit 314 interfaces with one of the second set of signal pins 312 in the transmission signal path to carry management communications and data communications. The second reception electrical interface unit 316 interfaces with one of the second set of signal pins 312 in the reception signal path also to carry management communications and data communications.

The first connecting unit 302 and the second connecting unit 304 are in communication with each other via a data channel, shown at reference numeral 320. The data channel may be any standard copper channel that is configured to carry data communications (e.g., high speed data communications) in a data communication path and management communications (e.g., low speed management communications) in a management communication path. The data cable 106, and in particular, the electrical interface units 308, 310, 314 and 316, are configured to carry both data communications and management communications between the switch host device 102 and a corresponding one of the extender units 104(1)-104(n).

Figure 4:
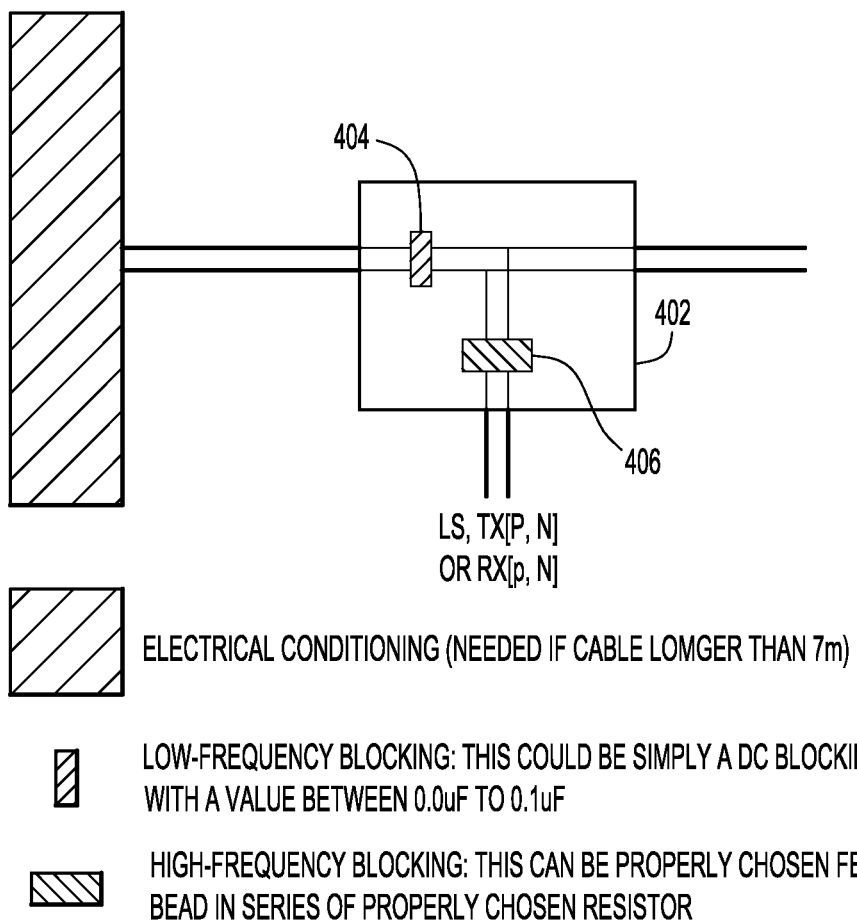
FIG. 4 shows an example of the data cable configured with low-frequency and high-frequency blocking units to enable management communications and data communications to be sent along the data cable.

Reference is now made to FIG. 4. FIG. 4 is example of the data cable 106 configured with an electrical interface unit. The electrical interface unit is shown at reference numeral 402 and may represent any of the electrical interface units 308, 310, 314 and 316, described above. As shown the electrical interface unit 402 has two components: a low-frequency blocking unit 404 and a high-frequency blocking unit 406. The low-frequency blocking unit 404 may be, for example, a low-frequency blocking capacitor (e.g., with a value between 0.01 micro-Farads and 0.1 micro-Farads) and the high-frequency blocking unit 406 may be, for example, a high-frequency ferrite bead in series of a properly chosen resistor. When data communications are sent in the data channel 106, the low-frequency blocking unit 404 blocks low speed communications (e.g., management communications) from entering the data communication path. Likewise, when management communications are sent in the data channel 106, the high-frequency blocking unit 406 blocks high speed communications (e.g., data communications) from entering the management communication path.

Figure 5:
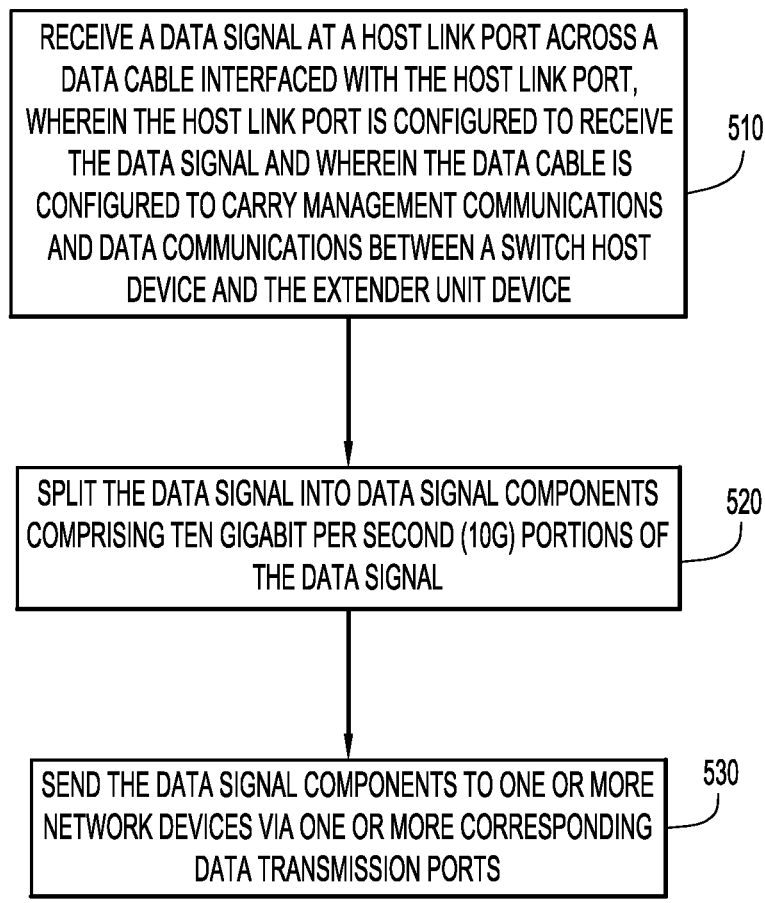
FIG. 5 shows an example flow chart describing data communications between the switch host device and one or more of the extender units.

Reference is now made to FIG. 5. FIG. 5 shows an example flow chart describing data communications between the switch host device 102 and one or more of the extender units 104(1)-104(n). At operation 510, one of the extender unit devices receives a data signal at a host link port across a data cable interfaced with the host link port. The host link port is configured to receive the data signal. The data cable is configured to carry management communications and data communications between the switch host device and the extender unit device. At operation 520, the data signal is split into data signal components comprising 10G portions of the data signal. At operation 530, the data signal components are sent to one or more network devices via one or more corresponding data transmission ports.

It should be appreciated that the techniques described above in connection with all embodiments may be performed by one or more computer readable storage media that is encoded with software comprising computer executable instructions to perform the methods and steps described herein. For example, the operations performed by the switch host device 102, the extender units 104(1)-104(n) and the data cables 106(1)-106(m) may be performed by one or more computer or machine readable storage media or device executed by a processor and comprising software, hardware or a combination of software and hardware to perform the techniques described herein.

In sum, a system is provided comprising: a switch host device comprising one or more host ports, each of which is configured to interface with either an enhanced quad-small form-factor pluggable (QSFP+) transceiver module capable of sending and receiving data at a first data rate of 40 gigabits per second (40G) or with a 12× small form-factor pluggable CXP transceiver module capable of sending and receiving data at a second data rate of 120 gigabits per second (120G); one or more extender units, each of which comprises a host link port and a plurality of data transmission ports, wherein the data transmission ports are each configured to interface with an enhanced small form-factor pluggable (SFP+) transceiver module that is capable of sending and receiving data at a data transmission rate of up to 10 gigabits per second (10G); and a data cable with a first end configured to interface with one of the host ports of the switch host device and one or more second ends configured to interface with one or more of the host link ports of the extender units, wherein the data cable is configured to carry management communications and data communications between the switch host device and the one or more extender units.

In addition, a method is provided comprising: at an extender unit device, receiving a data signal at a host link port across a data cable interfaced with the host link port, wherein the host link port is configured to receive the data signal and wherein the data cable is configured to carry management communications and data communications between a switch host device and the extender unit device; splitting the data signal into data signal components, wherein each of the data signal components comprises a ten gigabit per second (10G) portion of the data signal; and sending the data signal components to one or more network devices via one or more corresponding data transmission ports.

Furthermore, an apparatus is provided comprising: a first set of signal pins configured to interface with a host port of a switch host device; a second set of signal pins in communication with the first set of signal pins via a data channel, wherein the second set of signal pins is configured to interface with a host link port of an extender unit; a first transmission electrical interface unit and a first reception electrical interface unit, wherein the first transmission electrical interface unit interfaces with one of the first set of signal pins in a transmission signal path to carry management communications and data communications and wherein the first reception electrical interface unit interfaces with one of the second set of signal pins in a reception signal path to carry management communications and data communications; and a second transmission electrical interface unit and a second reception electrical interface unit, wherein the second transmission electrical interface unit interfaces with one of the second set of signal pins in the transmission signal path to carry management communications and data communications and wherein the second reception electrical interface unit interfaces with one of the second set of signal pins in the reception signal path to carry management communications and data communications.

Additionally, an apparatus is provided, comprising: a host link port configured to interface with a data cable and to receive a data signal from a switch host device at the host link port from the data cable; a clock data recovery (CDR) unit coupled to the host link port and configured to split the data signal into data signal components, wherein each of the data signal components comprises a ten gigabit per second (10G) portion of the data signal; and one or more data transmission ports coupled to the CDR unit and configured to send the data signal components to one or more system devices via corresponding ones of the data transmission ports.

The above description is intended by way of example only. Various modifications and structural changes may be made therein without departing from the scope of the concepts described herein and within the scope and range of equivalents of the claims.

What is claimed is:

1. A system comprising:
    a switch host device comprising one or more host ports, each of which is configured to interface with either an enhanced quad-small form-factor pluggable (QSFP+) transceiver module capable of sending and receiving data at a first data rate of 40 gigabits per second (40G) or with a 12× small form-factor pluggable CXP transceiver module capable of sending and receiving data at a second data rate of up to 120 gigabits per second (120G);
    one or more extender units, each of which comprises a host link port and-a plurality of data transmission ports, wherein the data transmission ports are each configured to interface with an enhanced small form-factor pluggable (SFP+) transceiver module that is capable of sending and receiving data at a data transmission rate of up to 10 gigabits per second (10G); and
    a data cable with a first end configured to interface with one of the host ports of the switch host device and one or more second ends configured to interface with one or more of the host link ports of the extender units, wherein the data cable is configured to carry management communications and data communications between the switch host device and the one or more extender units,
    wherein the data cable is a custom CXP to 3× QSFP+ Y-data cable that, in response to 120G data being sent between the switch host device and the one or more extender units, is configured such that the first end interfaces with a CXP host port and wherein the one or more one or more second ends comprise three second ends each of which is configured to interface with a host link port of one of the extender units, and wherein each of the extender units comprises four SFP+ data transmission ports.

2. The system of claim 1, wherein the one or more extender units are each configured to interface with the SFP+ transceiver module such that 10G data is sent and received across distances that are greater than distances of data transmissions enabled by the QSFP+ transceiver module or the CXP transceiver module.

3. The system of claim 1, wherein in response to 40G data being sent between the switch host device and the one or more extender units, the data cable is configured with the first end configured to interface with a QSFP+ host port at the switch host device and with one second end configured to interface with the host link port at one of the extender units.

4. The system of claim 3, wherein the one of the extender units is configured to send and receive 40G data transmissions across the host link port and is configured to send and receive four 10G data transmissions across the four SFP+ data transmission ports.

5. The system of claim 1, wherein in response to 120G data being sent between the switch host device and the one or more extender units, the data cable is configured with the first end configured to interface with a CXP host port and with one second end configured to interface with the host link port of one of the extender units, wherein the one of the extender units comprises 12 SFP+ data transmission ports.

6. The system of claim 5, wherein the one of the extender units is configured to send and receive 120G data transmissions across the host link port and is configured to send and receive 12 10G data transmissions across the 12 SFP+ data transmission ports.

7. A method comprising:
    at an extender unit device comprising a plurality of host link ports and at least four small form-factor pluggable (SFP+) data transmission ports each configured to interface with an enhanced SFP+ transceiver module that is capable of sending and receiving data at a data transmission rate of up to 10 gigabits per second (10G), receiving a data signal at 120 gigabits per second (120G) custom CXP to 3× quad-small form-factor pluggable (QSFP+) Y-data cable comprising a first end that interfaces with a CXP host port and three second ends each of which is configured to interface with one of three host link ports of the extender unit device, wherein the three host link ports are configured to receive the data signal and wherein the data cable is configured to carry management communications and data communications between the switch host device and the extender unit device;
    splitting the data signal into data signal components, wherein each of the data signal components comprises a 10G portion of the data signal; and
    sending the data signal components to one or more network devices via one or more corresponding data transmission ports.

8. The method of claim 7, wherein sending comprises sending the data signal components across distances that are greater than distances of data transmissions enabled by ports of the switch host device.

9. The method of claim 7, wherein splitting comprises splitting the data signal into 12 10G data signal components.

10. An apparatus comprising:
    at least three host link ports each configured to interface with a one of three second ends of a custom CXP to 3× quad-small form-factor pluggable (QSFP+) Y-data cable to receive a 120 gigabits per second (120G) data signal from a CXP host port of a switch host device connected to a first end of the data cable;
    a clock data recovery (CDR) unit coupled to the host link port and configured to split the data signal into data signal components, wherein each of the data signal components comprises a ten gigabit per second (10G) portion of the data signal; and
    at least four small form-factor pluggable (SFP+) data transmission ports each coupled to the CDR unit and each configured to interface with an enhanced small form-factor SFP+ transceiver module to send the data signal components to one or more system devices via corresponding ones of the data transmission ports.

11. The apparatus of claim 10, wherein the one or more data transmission ports are configured to send the data signal components across distances that are greater than distances of data transmissions enabled by ports of the switch host device.

12. The apparatus of claim 10, wherein the CDR unit is configured to split the data signal into 12 10G data signal components.

13. The system of claim 1, wherein the one or more extender units each comprise a clock data recovery (CDR) unit coupled to the host link ports, wherein each of the CDR unit is configured to split the data signal into data signal components that each comprises a 10G portion of the data signal.

14. The system of claim 1, wherein one or more extender units each comprises a low speed management interface unit configured to receive and adjust timing signals of the respective extender unit.

15. The system of claim 1, wherein the first end of the data cable comprises a first set of signal pins configured to interface with the CXP host port of the switch host device, wherein each of the three second ends comprises a second set of signal pins in communication with the first set of signal pins via a data channel, and wherein the data cable further comprises:

a first transmission electrical interface unit and a first reception electrical interface unit, wherein the first transmission electrical interface unit interfaces with one of the first set of signal pins in a transmission signal path to carry management communications and data communications, and wherein the first reception electrical interface unit interfaces with one of the second set of signal pins in a reception signal path to carry management communications and data communications; and a second transmission electrical interface unit and a second reception electrical interface unit, wherein the second transmission electrical interface unit interfaces with one of the second set of signal pins in the transmission signal path to carry management communications and data communications, and wherein the second reception electrical interface unit interfaces with one of the second set of signal pins in the reception signal path to carry management communications and data communications.

16. The system of claim 15, wherein the first transmission electrical interface unit, the first reception electrical interface unit, the second transmission electrical interface unit and the second reception electrical interface unit each comprises a low-frequency blocking unit to block management communications from being sent along a first corresponding signal path and a high-frequency blocking unit to block the data communications from being sent along a second corresponding signal path.

17. The system of claim 16, wherein the low-frequency blocking unit is a low-frequency blocking capacitor and wherein the high-frequency blocking unit is a high-frequency blocking capacitor.

18. The system of claim 1, wherein the data cable is configured to carry management communications and data communications.

\* \* \* \* \*